United States Patent

Raghu (10) Patent No.: US 9,932,495 B2
(45) Date of Patent: Apr. 3, 2018

(54) LIGNIN DERIVED PHOTO-RESPONSIVE COATINGS

(71) Applicant: EMPIRE TECHNOLOGY DEVELOPMENT LLC, Wilmington, DE (US)

(72) Inventor: Sivaraman Raghu, Tamilnadu (IN)

(73) Assignee: Empire Technology Development LLC, Wilmington, DE (US)

(*) Notice: Subject to any disclaimer, the term of this patent is extended or adjusted under 35 U.S.C. 154(b) by 43 days.

(21) Appl. No.: 14/694,250

(22) Filed: Apr. 23, 2015

(65) Prior Publication Data

US 2015/0307746 A1 Oct. 29, 2015

(30) Foreign Application Priority Data

Apr. 25, 2014 (IN) .......................... 2111/CHE/2014

(51) Int. Cl.
C09D 197/00 (2006.01)
C08K 3/22 (2006.01)

(52) U.S. Cl.
CPC .. C09D 197/005 (2013.01); C08K 2003/2231 (2013.01); C08K 2003/2241 (2013.01); C08K 2003/2258 (2013.01); C08K 2003/2296 (2013.01)

(58) Field of Classification Search
CPC .................. C09D 197/005; C08K 2003/2231
See application file for complete search history.

(56) References Cited

U.S. PATENT DOCUMENTS

| 8,232,365 | B2 | 7/2012 | Okabe et al. |
| 8,497,359 | B2 | 7/2013 | Fenn et al. |
| 2012/0141681 | A1 | 6/2012 | Kusuura |
| 2015/0135989 | A1* | 5/2015 | Raghu ................. C09D 5/1637 106/16 |

FOREIGN PATENT DOCUMENTS

CN 103965785 A * 8/2014

OTHER PUBLICATIONS

Krause. "Opportunities to improve fiber degradation in the rumen: microbiology, ecology, and genomics." FEMS Microbiol Rev (2006) 27 (5): 663-693. Jan. 9, 2006.*
Bandara et al., Proof for the concerted inversion mechanism in the trans→cis isomerization of azobenzene using hydrogen bonding to induce isomer locking, *J Org Chem.* (Jun. 14, 2010), 75(14):4817-4827.

(Continued)

*Primary Examiner* — Jessee Roe
*Assistant Examiner* — Alexander Polyansky
(74) *Attorney, Agent, or Firm* — Pepper Hamilton LLP (57) ABSTRACT

Coating compositions that provide hydrophilic and self-cleaning properties upon exposure to an electromagnetic spectrum are disclosed. Coatings can include lignin-coumarate derivatives and/or lignin-azobenzene derivatives. When exposed to the electromagnetic spectrum, these compounds isomerize to cis-configuration which are hydrophilic in nature as compared to when these compounds are in their hydrophobic trans-state.

9 Claims, 3 Drawing Sheets

(56) References Cited

OTHER PUBLICATIONS

Chandran et al., Synthesis, Characterization and Photoinduced Cis-Trans Isomerisation Studies on Lignin Modified with 4-[(E)-2-(3-Hydroxynaphthalen-2-yl)diazen-1-yl]benzoic Acid, *Open Journal of Organic Polymer Materials* (2012), 2(4):68-73.

Coumaric Acid, wikipedia, accessed at https://web.archive.org/web/20130424063153/http://en.wikipedia.org/wiki/Coumaric_acid, last modified on Dec. 24, 2012, pp. 1-2.

Ichimura et al., Role of E/Z Photoisomerization of Cinnamate Side Chains Attached to Polymer Backbones in the Alignment Photoregulation of Nematic Liquid Crystals, *Japanese Journal of Applied Physics* (Jun. 10, 1996), 35(Part 2, No. 8A): L992-L995 (Abstract).

Kawatsuki et al., Photoreaction of Photo-cross-linkable Methacrylate Polymer Films Comprising 2-Cinnamoyloxyethoxybiphenyl Side Group by Linearly Polarized Ultraviolet Light and Liquid Crystal Alignment on the Resultant Films, *Chem. Mater.* (Jun. 19, 2000), 12, 1549-1555.

Lignin, wikipedia, accessed at https://web.archive.org/web/20140422002116/http://en.wikipedia.org/wiki/Lignin, last modified on Apr. 20, 2014, pp. 1-8.

Pattanaargson et al., Photoisomerization of octyl methoxycinnamate, *Journal of Photochemistry and Photobiology A: Chemistry* (Jan. 30, 2004), 161(2-3):269-274 (Abstract).

Santurri et al., 4,4'-Diaminoazobenzene, *Organic Syntheses, Coll.* (1960), 5:341 (1973); vol. 40, p. 18 (1960).

Usman et al., trans-cis Photoisomerization of a Photoactive Yellow Protein Model Chromophore in Crystalline Phase, *Journal of Physical Chemistry B* (Sep. 26, 2006), 110(41):20085-20088 (Abstract).

Wang et al., Photoresponsive surfaces with controllable wettability, *Journal of Photochemistry and Photobiology C: Photochemistry Reviews* (Mar. 12, 2007), 8(1):18-29.

Zuev et al., Electronic structure of the two isomers of the anionic form of p-coumaric acid chromophore, *J. Chem. Phys.* (2011), 34:034310-1-034310-13.

* cited by examiner

LIGNIN DERIVED PHOTO-RESPONSIVE COATINGS

RELATED APPLICATION

This application claims priority benefit under Title 35 § 119(a) to the Indian Patent Application No. 2111/CHE/2014, filed Apr. 25, 2014, entitled, "Lignin Derived Photo-responsive Coatings," the contents of which are herein incorporated by reference.

BACKGROUND

Surface wettability is an important property of solid surfaces. A surface is said to be wettable if a liquid spreads over the surface evenly without the formation of droplets. Such surfaces tend to be hydrophilic in nature, allowing water to spread out. This implies that the forces associated with the interaction of water with the surface are greater than the cohesive forces associated with bulk liquid water. In contrast, water forms droplets on hydrophobic surfaces, implying that the cohesive forces associated with bulk water are greater than the forces associated with the interaction of water with the surface.

Paints and coatings, while protecting the substrate from the environment, can themselves be contaminated by unwanted substances over time. Dirt, for example, can dull the coating by increasing light scattering or by modifying the color component of the coating. Dirt can also affect the durability. It can often be expensive to clean a coated substrate. The chemicals used to clean a coated substrate can make their way into the environment where they can potentially cause great damage. A hydrophilic surface allows water to spread out in a thin layer, thus sweeping dirt off the surface as the water thins out and trickles away. Thus, it is desirable to have a coating with a hydrophilic surface that prevents dirt from sticking to the surface, is self-cleaning, and is made of eco-friendly chemicals.

SUMMARY

Disclosed herein are methods and coating compositions with lignin derivatives that provide hydrophilic and self-cleaning properties. In one embodiment, a coating composition comprises a lignin derivative of formula I, wherein X is —N=N— or —CH=CH—C(=O)—O-(alkylene)-O—C(=O)—CH=CH—;
each Z is, independently, H, alkyl, heteroalkyl, aryl, heteroaryl, alkoxy, nitro, cyano, halogen, or cycloalkyl; and
each R is, independently, —O— or —NH—.

In another embodiment, a method of modifying a hydrophobic surface to a hydrophilic surface may involve applying a coating to the surface, wherein the coating comprises a hydrophobic lignin derivative of formula (I)

wherein X is —N=N— or —CH=CH—C(=O)—O-(alkylene)-O—C(=O)—CH=CH—,
each Z is, independently, H, alkyl, heteroalkyl, aryl, heteroaryl, alkoxy, nitro, cyano, halogen, or cycloalkyl, R is —O— or —NH—; and
exposing the coating to an electromagnetic spectrum, whereby the hydrophobic lignin derivative is converted to a hydrophilic lignin derivative.

In an additional embodiment, a coated article may include a substrate and a coating disposed on at least one surface of the substrate, wherein the coating comprises a lignin derivative of formula I wherein X is —N=N— or —CH=CH—C(=O)—O-(alkylene)-O—C(=O)—CH=CH—, each Z is, independently, H, H, alkyl, heteroalkyl, aryl, heteroaryl, alkoxy, nitro, cyano, halogen, or cycloalkyl, and R is —O— or —NH—.

In a further embodiment, a method of preparing a coating involves forming a lignin epoxide by contacting lignin, epichlorohydrin, and a base in a solvent, contacting the lignin epoxide with a bis-coumarate compound to form a lignin derivative, and adding the lignin derivative to a coating composition.

In another embodiment, a method of preparing a coating involves forming lignin epoxide by contacting lignin, epichlorohydrin, and a base in a solvent, contacting the lignin epoxide with an azobenzene compound to form a lignin derivative, and adding the lignin derivative to a coating composition.

DETAILED DESCRIPTION

This disclosure is not limited to the particular systems, devices and methods described, as these may vary. The terminology used in the description is for the purpose of describing the particular versions or embodiments only, and is not intended to limit the scope.

As used herein, "alkylene" refers to a bivalent alkyl moiety having the general formula —$(CH_2)_n$—, where n is from about 1 to about 25, about 1 to about 20, or about 4 to about 20. By bivalent, it is meant that the group has two open sites each of which bonds to another group. Non-limiting examples include methylene, ethylene, trimethylene, pentamethylene, and hexamethylene. Alkylene groups can be substituted or unsubstituted, linear or branched bivalent alkyl groups.

"Substituted alkylene" refers to an alkylene as just described in which one or more hydrogen atoms attached to carbon of the alkylene is replaced by another group, such as halogen, aryl, substituted aryl, alkyl, cycloalkyl, substituted cycloalkyl, and combinations thereof.

As used herein, the term "alkyl" means a saturated hydrocarbon group which is straight-chained or branched. An alkyl group can contain from 1 to 20 carbon atoms, from 2 to 20 carbon atoms, from 1 to 10 carbon atoms, from 2 to 10 carbon atoms, from 1 to 8 carbon atoms, from 2 to 8 carbon atoms, from 1 to 6 carbon atoms, from 2 to 6 carbon atoms, from 1 to 4 carbon atoms, from 2 to 4 carbon atoms, from 1 to 3 carbon atoms, or 2 or 3 carbon atoms. Examples of alkyl groups include, but are not limited to, methyl (Me), ethyl (Et), propyl (n-propyl and isopropyl), butyl (n-butyl, t-butyl, isobutyl), pentyl (n-pentyl, isopentyl, neopentyl), hexyl, isohexyl, heptyl, 4,4 dimethylpentyl, octyl, 2,2,4-trimethylpentyl, nonyl, decyl, undecyl, dodecyl, 2-methyl-1-propyl, 2-methyl-2-propyl, 2-methyl-1-butyl, 3-methyl-1-butyl, 2-methyl-3-butyl, 2-methyl-1-pentyl, 2,2-dimethyl-1-propyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, and the like. Alkyl groups may be substituted or unsubstituted.

"Substituted alkyl" refers to an alkyl as just described in which one or more hydrogen atoms attached to carbon of the alkyl is replaced by another group, such as halogen, aryl, substituted aryl, alkyl, cycloalkyl, substituted cycloalkyl, and combinations thereof. Suitable substituted alkyls include, for example, benzyl and trifluoromethyl.

As used herein, the term "aryl" means a monocyclic, bicyclic, or polycyclic (example, having 2, 3 or 4 fused rings) aromatic hydrocarbons. In some embodiments, aryl groups have 6 to 20 carbon atoms or 6 to 10 carbon atoms. Examples of aryl groups include, but are not limited to, phenyl, naphthyl, anthracenyl, phenanthrenyl, indanyl, indenyl, tetrahydronaphthyl, and the like. The aryl groups may also be substituted or unsubstituted.

"Substituted aryl" refers to aryl as just described in which one or more hydrogen atoms attached to any carbon atoms is replaced by one or more functional groups such as alkyl, substituted alkyl, cycloalkyl, substituted cycloalkyl, heterocycloalkyl, substituted heterocycloalkyl, halogen, halogenated alkyl (example, $CF_3$), hydroxy, amino, phosphino, alkoxy, amino, thio and both saturated and unsaturated cyclic hydrocarbons which are fused to the aromatic ring(s), linked covalently or linked to a common group such as a methylene or ethylene moiety. The linking group may also be a carbonyl such as in cyclohexyl phenyl ketone. Examples of substituted aryls include perfluorophenyl, chlorophenyl, 3,5-dimethylphenyl, 2,6-diisopropylphenyl and the like.

As used herein, the term "alkoxy" means a straight or branched —O-alkyl group of 1 to 20 carbon atoms, including, but not limited to, methoxy, ethoxy, n-propoxy, isopropoxy, t-butoxy, and the like. In some embodiments, the alkoxy chain is 1 to 10 carbon atoms in length, 1 to 8 carbon atoms in length, 1 to 6 carbon atoms in length, 1 to 4 carbon atoms in length, 2 to 10 carbon atoms in length, 2 to 8 carbon atoms in length, 2 to 6 carbon atoms in length, or 2 to 4 carbon atoms in length.

As used herein, the term "cycloalkyl" means non-aromatic cyclic hydrocarbons including cyclized alkyl, alkenyl, and alkynyl groups that contain up to 20 ring-forming carbon atoms. Cycloalkyl groups can include mono- or polycyclic ring systems such as fused ring systems, bridged ring systems, and spiro ring systems. In some embodiments, polycyclic ring systems include 2, 3, or 4 fused rings. A cycloalkyl group can contain 3 to 15 ring-forming carbon atoms, 3 to 10 ring-forming carbon atoms, 3 to 8 ring-forming carbon atoms, 3 to 6 ring-forming carbon atoms, 4 to 6 ring-forming carbon atoms, 3 to 5 ring-forming carbon atoms, or 5 or 6 ring-forming carbon atoms.

As used herein, the term "heteroalkyl" refers to alkyl groups in which one or more C atoms are replaced by oxygen, nitrogen, sulfur or combinations thereof.

As used herein, the term "heteroaryl" means an aromatic heterocycle having up to 20 ring-forming atoms (example, C) and having at least one heteroatom ring member (ring-forming atom) such as sulfur, oxygen, or nitrogen. In some embodiments, the heteroaryl group has at least one or more heteroatom ring-forming atoms, each of which are, independently, sulfur, oxygen, or nitrogen. In some embodiments, the heteroaryl group has 3 to 20 ring-forming atoms, 3 to 10 ring-forming atoms, 3 to 6 ring-forming atoms, or 3 to 5 ring-forming atoms. In some embodiments, the heteroaryl group contains 2 to 14 carbon atoms, 2 to 7 carbon atoms, or 5 or 6 carbon atoms. In some embodiments, the heteroaryl group has 1 to 4 heteroatoms, 1 to 3 heteroatoms, or 1 or 2 heteroatoms.

Disclosed herein are methods and coating compositions with lignin derivatives that provide hydrophilic and self-cleaning properties. Lignin, which represents 15-35% of wood, is the most abundant renewable organic material on the earth. The biofuel and paper industries produce large amounts of biomass waste products, such as lignin. Lignin is a highly cross-linked, heavily aromatic, polymeric product that has little value to these industries, and as such is treated as a waste material. Lignin represents an inexpensive material that is rich with functional groups made up of phenols and primary and secondary alcohols, which can be easily reacted with other groups. An exemplary generic lignin structure is given below:

Softwood lignin fragment

Figure 1:
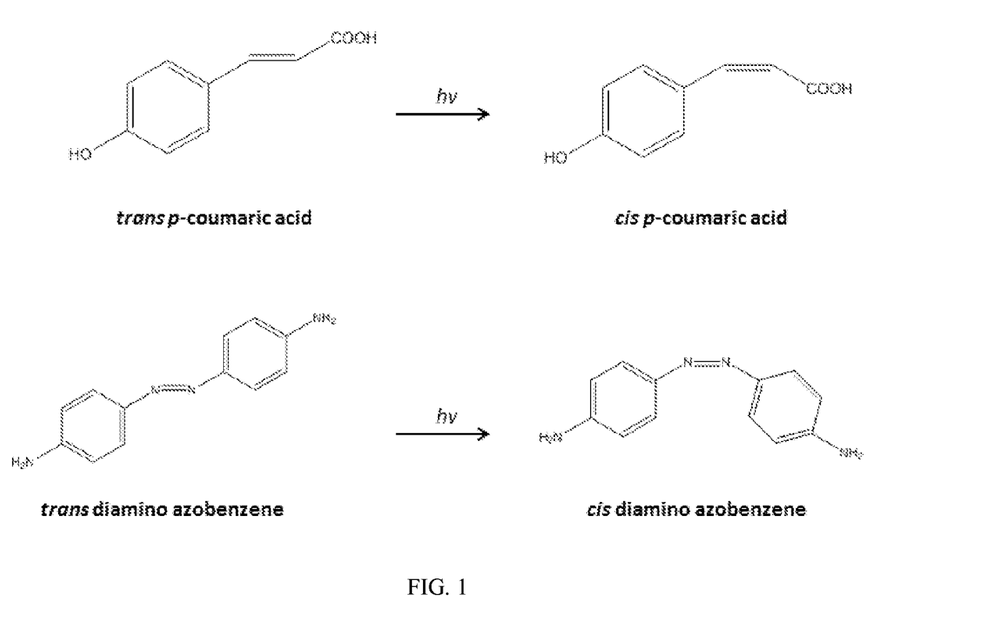
FIG. 1 depicts isomers of p-coumaric acid and diamino azobenzene according to an embodiment.

Several organic compounds, such as azobenzenes, spiropyrans, and cinnamates undergo photo-induced reversible trans to cis isomerization upon absorption of energy. These compounds later revert back to their stable trans configura- tion when the energy is lost. However, these organic compounds display different molecular polarity and surface free energy between these two states. For example, coumarates and azobenzene in their cis-configuration are more hydrophilic than their corresponding trans-state. FIG. 1 illustrates trans and cis isomers of p-coumaric acid and diamino azobenzene.

Figure 2:
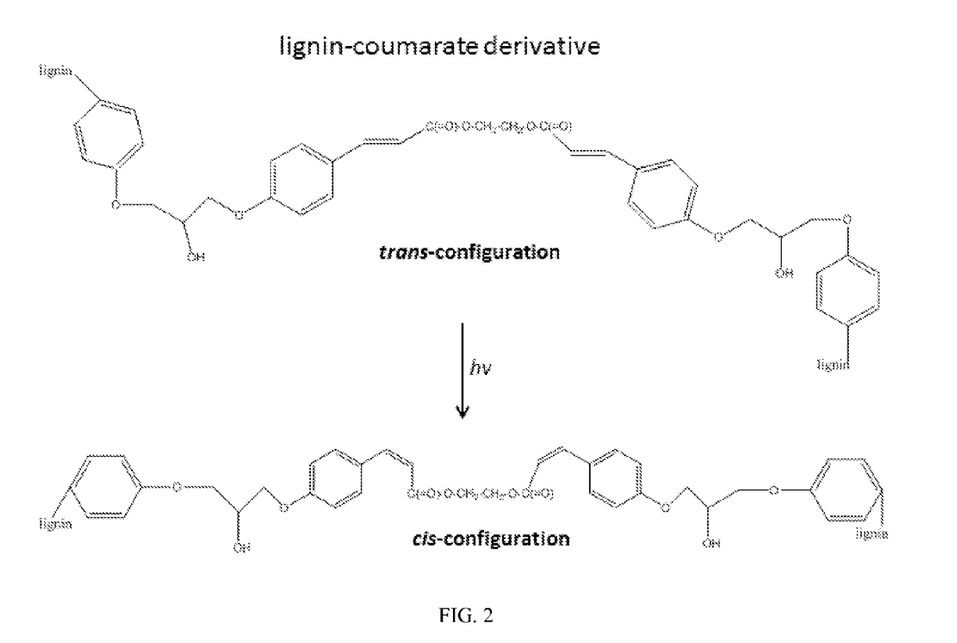
FIG. 2 shows trans and cis configurations of lignin-coumarate derivate according to an embodiment.
Figure 3:
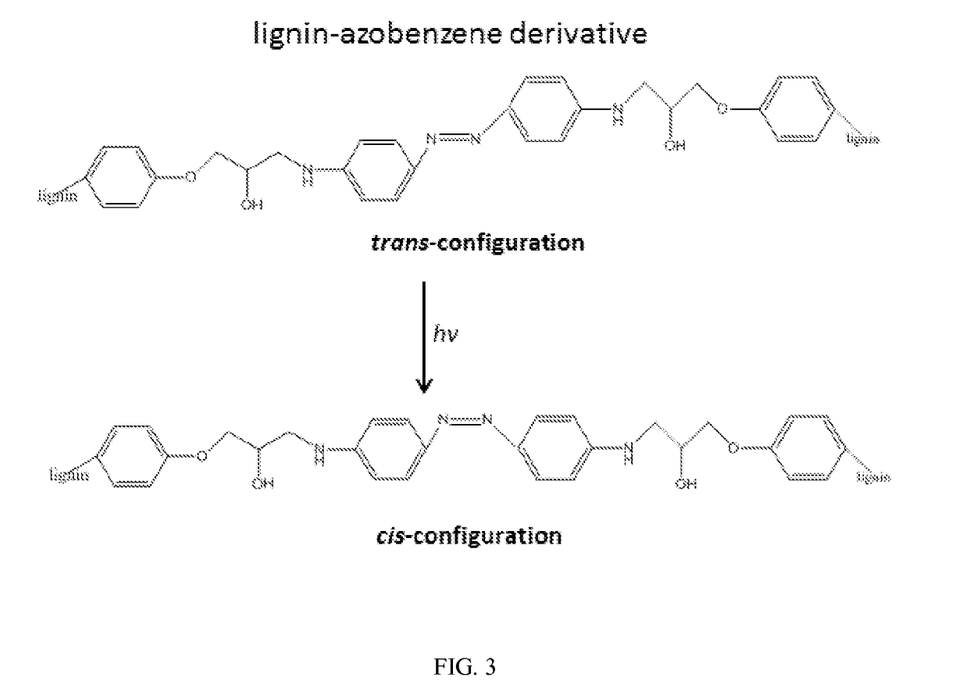
FIG. 3 shows trans and cis configurations of lignin-azobenzene derivate according to an embodiment.

The present disclosure describes coatings and paints that include lignin derivatives of coumarate and azobenzene in cis-configuration, which provide hydrophilic and/or self-cleaning properties when exposed to electromagnetic spectrum. Since lignins have numerous phenolic groups, these phenolic groups can be reacted with epichlorohydrin to give lignin epoxides, which in turn can be reacted with coumarates and azobenzenes. Upon exposure to an electromagnetic spectrum, coumarates and azobenzenes may isomerize to hydrophilic cis-conformations. However, because of configurational constraints in the polymer, the cis configuration will be locked on curing and will exhibit hydrophilic properties. FIG. 2 and FIG. 3 show lignin derivatives in trans and cis configurations.

In some embodiments, a coating composition comprises a lignin derivative of formula I, about 200 nanometers, about 300 nanometers, about 400 nanometers, about 500 nanometers, about 600 nanometers, about 700 nanometers, about 800 nanometers, about 900 nanometers, about 1000 nanometers, about 1100 nanometers, about 1200 nanometers, about 1300 nanometers, about 1400 nanometers, about 1500 nanometers, about 1600 nanometers, about 1700 nanometers, about 1800 nanometers, about 1900 nanometers, about 2000 nanometers, and ranges between (and including the endpoints of) any two of these values.

The lignin derivatives described herein may be present in the coating composition at various concentrations, such as about 0.5 to about 20 weight percent, at about 0.5 to about 15 weight percent, at about 0.5 to about 10 weight percent, at about 0.5 to about 5 weight percent, or at about 0.5 to about 1 weight percent. Specific examples include about 0.5 weight percent, about 1 weight percent, about 3 weight percent, about 5 weight percent, about 10 weight percent, about 15 weight percent, about 20 weight percent of the total weight, and ranges between (and including the endpoints of) any two of these values. In some embodiments, the lignin derivatives may be incorporated in the paint composition at the end of the process, and mixed with the paint before use.

(I)

wherein X is —N=N— or —CH=CH—C(=O)—O-(alkylene)-O—C(=O)—CH=CH—;

each Z is, independently, H, alkyl, heteroalkyl, aryl, heteroaryl, alkoxy, nitro, cyano, halogen, or cycloalkyl; and each R is, independently, —O— or —NH—.

In some embodiments, X is —N=N—; each Z is, independently, H, alkyl, heteroalkyl, aryl, heteroaryl, alkoxy, nitro, cyano, halogen, or cycloalkyl; and R is —NH—.

In some embodiments, X is —N=N—; each Z is, independently, H, alkyl, aryl, alkoxy, or cycloalkyl; and each R is —NH—.

In some embodiments, X is —CH=CH—C(=O)—O-(alkylene)-O—C(=O)—CH=CH—; each Z is, independently, H, alkyl, heteroalkyl, aryl, heteroaryl, alkoxy, nitro, cyano, halogen, or cycloalkyl; and each R is —O—.

In some embodiments, X is —CH=CH—C(=O)—O-(alkylene)-O—C(=O)—CH=CH—; each Z is, independently, H, alkyl, aryl, alkoxy, or cycloalkyl; and each R is —O—.

In some embodiments, the lignin derivatives described herein may be present in a cis configuration after exposure to an electromagnetic spectrum. In some embodiments, the lignin derivatives may be present in both trans and cis configuration after exposure to an electromagnetic spectrum. In some embodiments, the coating may be configured to provide hydrophilic properties, self-cleaning properties, or both when exposed to an electromagnetic spectrum.

In some embodiments, the electromagnetic spectrum may comprise UV, visible light, IR, or any combination thereof. The electromagnetic spectrum may have a wavelength of about 200 nanometers to about 2000 nanometers, about 200 nanometers to about 1000 nanometers, about 200 nanometers to about 500 nanometers, about 200 nanometers to about 400 nanometers, or about 300 nanometers to about 1400 nanometers. Specific examples of wavelengths include For example, an end consumer may add the lignin derivatives to any conventional paint formulation before use.

In additional embodiments, the coating composition may further contain one or more additives. These additives may alter properties of the paint made from the coating composition, such as shelf life, and application and longevity. Such additives may be added, for example, during the manufacture of emulsion polymers in the paint or during the formulation of the paint itself. Illustrative additives may include initiators, rheology modifiers, preservatives, and the like. Initiators are a source of free radicals to initiate the polymerization process in which monomers form polymers. Coating compositions may contain a redox system initiator, such as ferrous and thiosulfate along with the persulfate salts, that promote polymerization at room temperature.

In some embodiments, thickeners and rheology modifiers may also be added to coating compositions to achieve desired viscosity and flow properties. Thickeners form multiple hydrogen bonds with the acrylic polymers, thereby causing chain entanglement, looping and/or swelling which results in volume restriction. Thickeners, such as cellulose derivatives including hydroxyethyl cellulose, methyl cellulose and carboxymethyl cellulose, may be used in the coating compositions.

In some embodiments, one or more preservatives may be added in the coating compositions in low doses to protect against the growth of microorganisms. Preservatives, such as methyl benzisothiazolinones, chloromethylisothiazolinones, barium metaborate and 1-(3-chloroallyl)-3,5,7-triaza-1-azoniaadamantane chloride, may be used.

In some embodiments, the coating composition may further contain one or more of the following additives: solvents, pigments, plasticizers, surfactants and the like. Surfactants may be used, for example, to create the micelles for particle formation, as well as long-term particle stabilization. Surfactants may provide stability through electrostatic and steric hindrance mechanisms. Both ionic and non-ionic surfactants may be used. Examples may include, but are not limited to, alkyl phenol ethoxylates, sodium lauryl sulfate, dodecylbenzene sulfonate, polyoxyethylene alkyl ethers, polyoxyethylene alkyl allyl ethers, acetylene glycols, polyoxyethylene, stearic acid and polyoxypropylene.

Coalescing agents, such as ester alcohols, benzoate ethers, glycol ethers, glycol ether esters and n-methyl-2-pyrrolidone, may be added to the coating compositions. Coalescing agents may be added to, for example, insure film formation under varying atmospheric conditions. They may be slow evaporating solvents with some solubility in the polymer phase. They may also act as a temporary plasticizer, allowing film formation at temperatures below the system's glass transition temperature. After film formation, the coalescing agents may slowly diffuse to the surface and evaporate, increasing the hardness and block resistance of the film.

In some embodiments, one or more plasticizers may be added to the compositions to adjust the tensile properties of the paint film. Plasticizers include, for example, a glucose-based derivative, a glycerine-based derivative, propylene glycol, ethylene glycol, phthalates and the like.

A paint, according to the disclosure, may further include one or more pigments. The term "pigments" is intended to embrace, without limitation, pigmentary compounds employed as colorants, including white pigments, as well as ingredients commonly known in the art as "opacifying agents" and "fillers". Pigments may be any particulate organic or inorganic compound and may provide coatings the ability to obscure a background of contrasting color (hiding power). In some embodiments, the coating may further include photocatalytic pigments, such as titanium dioxide, zinc oxide, tin oxide, tungsten oxide, chromium oxide, hematite, magnetite, wustite, or any combination thereof. The photocatalytic pigments may be nanoparticles having an average diameter of about 0.1 nanometer to about 100 nanometers. The photocatalytic properties of these pigments may result from the promotion of electrons from the valence band to the conduction band under the influence of an electromagnetic spectrum. The reactive electron-hole pairs that are created migrate to the surface of these pigment particles where the holes oxidize adsorbed water to produce reactive hydroxyl radicals and the electrons reduce adsorbed oxygen to produce superoxide radicals, both of which can degrade organic compounds and grease sticking to the surface of a coating. In addition to self-cleaning properties, the photocatalytic pigments in paints may also provide hydrophilic properties to a coating. The presence of the photocatalytic pigments along with coumarates and/or azobenzene functional groups may provide a synergistic effect to produce a super hydrophilic coating.

In some embodiments, the coating compositions may include a binder. The binder may be an organic polymeric binder, a silicone polymeric binder, or both. In the broadest aspect, it is contemplated that any polymeric binder may be employed. In some embodiments, the polymeric binder is a water-dispersible polymer. The water-dispersible polymer may include, for example, a polymer or a copolymer of the following: alkylacrylate, alkyl methacrylate, allyl methacrylate, acrylic acid, methacrylic acid, acrylamide, 2-hydroxyethyl methacrylate, 2-hydroxypropyl methacrylate, thioethyl methacrylate, vinyl methacrylate, vinyl benzene, 2-hydroxyethyl acrylate, butyl acrylate, 2-ethylhexyl acrylate, vinyltrimethoxysilane, vinyltriethoxysilane, vinyl formate, vinyl acetate, vinyl propionate, vinyl butyrate, vinyl hexanoate, vinyltoluene, α-methyl styrene, chlorostyrene, styrenesulfonic acid, and combination thereof. Coating compositions may also include a single binder or a mixture of two or more polymeric binders that may be of the same class or different classes. For example, organic binders may be combined with a silicone-based binder. Inorganic binders may include, without limitation, alkali metal polysilicates, such as potassium polysilicate, sodium polysilicate, lithium polysilicate or the like.

The hydrophilic coating compositions, when applied to a substrate and cured, result in a hydrophilic coating. A hydrophilic coating composition may be a liquid hydrophilic coating composition, such as a solution or a dispersion including a liquid medium. Any liquid medium that allows application of the hydrophilic coating formulation on a surface may suffice. Examples of liquid media are alcohols, like methanol, ethanol, propanol, butanol or respective isomers and aqueous mixtures thereof, acetone, methylethyl ketone, tetrahydrofuran, dichloromethane, toluene, and aqueous mixtures or emulsions thereof. Another example of liquid media may also be water. The coating compositions may also be a latex emulsion, non-aqueous dispersion, or powder. The hydrophilic coating composition may further include components that when cured are converted into the hydrophilic coating, and thus remain in the hydrophilic coating after curing. As used herein, curing refers to physical or chemical hardening or solidifying by any method, for example heating, cooling, drying, crystallizing, or curing as a result of a chemical reaction, such as radiation-curing or heat-curing. In the cured state, all or a portion of the components in the hydrophilic coating formulation may be cross-linked forming covalent linkages between all or a portion of the components, for example by using UV or electron beam radiation. In addition, in the cured state, all or a portion of the components may be ionically bonded, bonded by dipole-dipole type interactions, or bonded via Van der Waals forces or hydrogen bonds.

To apply the hydrophilic coating on the substrate, a primer coating may optionally be used in order to promote or provide binding between the hydrophilic coating and the substrate. In some instances, the primer coating facilitates adhesion of the hydrophilic coating to the substrate. The binding between the primer coating and the hydrophilic coating may occur due to covalent or ionic links, hydrogen bonding, or polymer entanglements. These primer coatings may be solvent-based, water-based (latexes or emulsions) or solvent-free and may include linear, branched and/or cross-linked components. Typical primer coatings that could be used include for example, polyether sulfones, polyurethanes, polyesters, polyacrylates, polyamides, polyethers, polyolefins and copolymers thereof. The hydrophilic coatings can also be applied on the substrate without a primer.

The coatings may be used as a decorative coating, an industrial coating, a protective coating, a UV-protective coating, a self-cleaning coating, a biocidal coating, or any combination thereof. The coatings may generally be applied to any substrate. The coated substrate may be an article, an object, a vehicle or a structure. Although no particular limitation is imposed on the substrate to be used in the present disclosure, exemplary substrates include an exterior of a building, vehicles, bridges, airplanes, metal railings, fences, glasses, plastics, ceramics, wood, stones, cement, fabric, paper, leather, walls, pipes, vessels, medical devices, kitchen appliances, kitchen cabinets, outdoor furniture, aluminum siding, metal products, washing machines, ships, chemical plants, automobiles, farm implements, containers, floor surfaces, and the like. The coating may be applied to the substrates described herein by any known technique in the art, such as spraying, dipping, rolling, brushing, or any combination thereof.

In some embodiments, a method of modifying a hydrophobic surface to a hydrophilic surface may involve applying a coating to the surface, wherein the coating comprises a hydrophobic lignin derivative of formula (I) described herein, and exposing the coating to an electromagnetic spectrum, whereby the hydrophobic lignin derivative is converted to a hydrophilic lignin derivative. In some embodiments, the coating may be exposed to an electromagnetic spectrum described herein for about 10 minutes to about 6 hours, for about 10 minutes to about 5 hours, for about 10 minutes to about 4 hours, for about 10 minutes to about 2 hours, or for about 10 minutes to about 1 hour. Specific examples of exposure times include about 10 minutes, about 30 minutes, about 1 hour, about 2 hours, about 3 hours, about 4 hours, about 5 hours, about 6 hours, and ranges between (and including the endpoints of) any two of these values.

Also disclosed herein are methods to prepare coatings with lignin-coumarate derivatives. In some embodiments, a method of preparing a coating may involve forming a lignin epoxide by contacting lignin, epichlorohydrin, and a base in a solvent, contacting the lignin epoxide with a bis-coumarate compound to form a lignin derivative, and adding the lignin derivative to a coating composition.

In some embodiments, lignin, epichlorohydrin, and a base may be contacted with a solvent, such as tetrahydrofuran, dioxane, methylene chloride, chloroform, pyridine, diethyl ether, benzene, toluene, methanol, ethanol, N, N-dimethylformamide, formamide, N, N-dimethylacetamide, acetonitrile, nitromethane, acetone, ethyl acetate, or any combination thereof. The base may be potassium carbonate, triethylamine, sodium carbonate, or any combination thereof.

The lignin, epichlorohydrin, and the base may be mixed in the solvent at a temperature below room temperature, such as below or about 15° C., below or about 12° C., below or about 10° C., or below or about 5° C. Specific examples include about 2° C., about 5° C., about 8° C., about 10° C., or about 15° C. At the end of the reaction, the reaction mixture may be filtered and the filtrate, the lignin epoxide, may be contacted with a bis-coumarate compound.

In some embodiments, the bis-coumarate compound may be prepared by contacting coumaric acid or derivatives thereof with a diol. The coumaric acid derivatives include alkyl coumarates, such as but not limited to, methyl coumarate, ethyl coumarate, propyl coumarate, butyl coumarate, or any combination thereof. Non-limiting examples of diol include ethylene glycol, diethylene glycol, propane-1,2-diol, propane-1,3-diol, butane-1,2-diol, butane-1,3-diol, butane-1,4-diol, 2-methylpropane-1,2-diol, 2-methylpropane-1,3-diol, pentane-1,2-diol, pentane-1,3-diol, pentane-1,4-diol, pentane-1,5-diol, pentane-2,3-diol, pentane-2,4-diol, 2-methyl-pentane-2,4-diol, hexane-1,2-diol, hexane-1,3-diol, hexane-1,4-diol, hexane-1,5-diol, hexane-1,6-diol, hexane-2,3-diol, hexane-2,4-diol, hexane-2,5-diol, hexane-3,4-diol, heptane-1,2-diol, heptane-1,3-diol, heptane-1,4-diol, heptane-1,5-diol, heptane-1,6-diol, heptane-1,7-diol, heptane-2,3-diol, heptane-2,4-diol, heptane-2,5-diol, heptane-2,6-diol, heptane-3,4-diol, heptane-3,5-diol, octane-1,2-diol, octane-1,3-diol, octane-1,4-diol, octane-1,5-diol, octane-1,6-diol, octane-1,7-diol, octane-1,8-diol, octane-2,3-diol, octane-2,4-diol, octane-2,5-diol, octane-2,6-diol, octane-2,7-diol, octane-3,4-diol, octane-3,5-diol, octane-3,6-diol, octane-4,5-diol, or any combination thereof.

In some embodiments, the coumaric acid and its derivatives thereof and the diol are contacted in a molar ratio of about 1:0.1 to about 1:1, about 1:0.1 to about 1:0.8, about 1:0.1 to about 1:0.5, or about 1:0.1 to about 1:0.2. Specific examples of molar ratios include about 1:0.1, about 1:0.2, about 1:0.5, about 1:0.8, about 1:1, and ranges between (and including the endpoints of) any two of these values.

In some embodiments, the coumaric acid and derivatives thereof and the diol may be heated to a temperature of about 60° C. to 120° C., about 60° C. to 100° C., about 60° C. to 90° C., or about 60° C. to 80° C. Specific examples of temperatures include about 60° C., about 70° C., about 80° C., about 90° C., about 100° C., about 110° C., about 120° C., and ranges between (and including the endpoints of) any two of these values. In some embodiments, a catalyst such as p-toluene sulfonic acid may be included in the reaction process. The coumaric acid or the derivatives thereof and the diol may be heated for about 1 hour to about 4 hours, about 1 hour to about 3 hours, or about 1 hour to about 2 hours. Specific examples of heating times include about 1 hour, about 2 hours, about 3 hours, about 4 hours, and ranges between (and including the endpoints of) any two of these values. At the end of this reaction process, the bis-coumarate compound may be purified by any means known in the art.

In some embodiments, the lignin epoxide may be contacted with bis-coumarate compound by heating to an elevated temperature, such as about 60° C. to about 90° C., about 70° C. to about 90° C., about 80° C. to about 90° C., or about 85° C. to about 90° C. Specific examples include about 60° C., about 70° C., about 80° C., about 90° C., and ranges between any two of these values (including their endpoints). The heating may be performed for a period of time, such as about 10 minutes to about 2 hours, about 30 minutes to about 2 hours, about 45 minutes to about 2 hours, or about 1 hour to about 2 hours. Specific examples include about 10 minutes, about 30 minutes, about 1 hour, about 1.5 hours, about 2 hours, and ranges between any two of these values (including their endpoints). At the end of the reaction, the solvent may be removed by one or more methods, such as evaporation, extraction, distillation, or a combination thereof.

Also disclosed herein are methods to prepare coatings with lignin-azobenzene derivatives. In some embodiments, a method of preparing a coating may involve forming a lignin epoxide by contacting lignin, epichlorohydrin, and a base in a solvent, contacting the lignin epoxide with an azobenzene compound to form a lignin derivative, and adding the lignin derivative to a coating composition. Non-limiting examples of azobenzene compounds include 4-4'-diamino azobenzene, substituted 4-4'-diamino azobenzene, 3,3'-diamino azobenzene, 4,4' di-paraaminophenyl azobenzene, 4,4'-diamino 3,3' dialkyl azobenzene, 4,4'-diamino 3,3' dihalo azobenzene, 4,4'-diamino 3,3' dialkoxy azobenzene, 4,4'-diamino 3,3 'diaryl azobenzene, 4,4'-diamino 3,3' dihydroxy azobenzene, 4,4'-diamino 3,3'diheteroaryl azobenzene, and combinations thereof.

The lignin epoxide may be prepared by the methods as described earlier. In some embodiments, the lignin epoxide may be contacted with azobenzene compound by heating to an elevated temperature, such as about 60° C. to about 90° C., about 70° C. to about 90° C., about 80° C. to about 90° C., or about 85° C. to about 90° C. Specific examples include about 60° C., about 70° C., about 80° C., about 90° C., and ranges between any two of these values (including their endpoints). The heating may be performed for a period of time, such as about 10 minutes to about 2 hours, about 30 minutes to about 2 hours, about 45 minutes to about 2 hours, or about 1 hour to about 2 hours. Specific examples include about 10 minutes, about 30 minutes, about 1 hour, about 1.5 hours, about 2 hours, and ranges between any two of these values (including their endpoints). At the end of the reaction, the solvent may be removed by one or more methods, such as evaporation, extraction, distillation, or a combination thereof.

EXAMPLES

Example 1: Preparation of Lignin-Coumarate Derivative

Methyl coumarate (17.7 grams, 0.1 mole) and ethylene glycol (3.1 grams, 0.05 mole) are dissolved in 200 ml of toluene. About 1 gram of p-toluene sulfonic acid is added and the mixture is heated to about 90° C. The distillate of toluene-methanol is collected over 2 hours (8 mL). The contents are then washed with a 5% bicarbonate solution, and the toluene is removed at 50° C. under a slight vacuum. The residue, a waxy solid (16.8 grams, 94%) is analyzed for ethylene 1,2 bis trans-coumarate.

About 10 grams of lignin dissolved in 100 mL of tetrahydrofuran is mixed with 2 grams of solid potassium carbonate. A solution mixture of 2.5 mL of epichlorohydrin and 10 mL of tetrahydrofuran is added, and the temperature is maintained below 10° C. The solution is filtered and to the filtrate about 5 grams of ethylene 1,2 bis trans-coumarate is added. The mixture is heated to 80° C. for 15 minutes. The solvent is removed under reduced pressure to obtain a solid lignin-coumarate derivative.

Example 2: Preparation of Lignin-Azobenzene Derivative

About 500 mL of glacial acetic acid, 29 grams of p-amino acetanilide, 40 grams of sodium perborate tetrahydrate, and 10 grams of boric acid were mixed in a reaction vessel and the mixture was heated for 6 hours with constant stirring at 55-65° C. The mixture was cooled to room temperature and the yellow product obtained was collected on a Buchner funnel. This was washed with water, and filtered to obtain 4,4'-bis(acetamido) azobenzene.

About 150 mL of methanol, 150 mL of 6N hydrochloric acid, and the above obtained 4,4'-bis(acetamido) azobenzene were heated under reflux for 1.5 hours. The reaction mixture was collected on a Buchner funnel. The damp product was suspended in 500 mL of water in a 1 liter beaker equipped with a stirrer, and the mixture was slowly neutralized by adding 2.5 N sodium hydroxide. The product was collected on a Buchner funnel, washed with water, and dried in an oven. The product formed was 4,4'-diaminoazobenzene which was yellow in color.

About 10 grams of lignin dissolved in 100 mL of tetrahydrofuran was mixed with 2 grams of solid potassium carbonate. A solution mixture of 2.5 mL of epichlorohydrin and 10 mL of tetrahydrofuran was added, and the temperature was maintained below 10° C. The solution was filtered and to the filtrate about 5 grams of 4,4'-diaminoazobenzene was added. The mixture was heated to 60° C. for 30 minutes. The solvent was removed under reduced pressure to obtain a solid lignin-azobenzene derivative.

Example 3: Evaluation of Hydrophilic Property

A hydrophilic coating comprising lignin-azobenzene derivative of Example 2 is coated on a glass surface and dried at room temperature. The surface is irradiated with UV light for 30 minutes. The surface free energy and the water droplet contact angle of the hydrophilic coating are measured as follows. A Zisman plotting method is employed for measuring the surface free energy. The surface tension of various concentrations of the aqueous solution of magnesium chloride is plotted along the X-axis, and the contact angle in terms of cos θ is plotted along the Y-axis. A graph with a linear relationship between the two is obtained. The graph is extrapolated such that the surface tension at contact angle 0° is measured and is defined as the surface free energy of the solid. The surface free energy of the glass surface measured will be 85 milliNewton/meter.

Example 4: An Object Coated with Hydrophilic Paint

Three identical metal pieces were coated with a hydrophilic paint comprising lignin-azobenzene derivative of Example 2. One coated metal piece was exposed to UV light, one was exposed to sunlight, and one was kept in the dark for 30 minutes. All the three coated surfaces were investigated for hydrophilicity. The contact angle made by a drop of water on metal pieces that were exposed to UV light and sunlight was less than 30°. This suggested that exposing the coating to electromagnetic spectrum induces hydrophilic properties.

Example 5: An Object Coated with Hydrophilic Paint

A metal table is painted with a hydrophilic coating comprising lignin-coumarate derivative of Example 1 and is allowed to dry at room temperature. The surface is irradiated with UV light for 30 minutes. The surface free energy of the table is measured as explained in Example 4 and will be 86 milliNewton/meter. The anti-fouling property of the coating is measured as follows: A line is drawn on the above mentioned coated table using oily ink. A similar line is also drawn on a table which is coated with an otherwise similar coating without lignin derivative. An uncoated table is also used in this experiment. A water jet is continuously applied on all three surfaces and periodically checked whether the oily line is still present. The oily ink applied on the table with the lignin-coumarate derivative coating will be erased after about 1 minute, whereas the oily line on the un-coated table or on the table lacking the lignin-coumarate derivative will be un-changed and visible.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (example, bodies of the appended claims) are generally intended as "open" terms (example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:
1. A coating composition comprising:
a lignin derivative of formula I,

-continued wherein X is one of —N=N— or —CH=CH—C(=O)—O-(alkylene)-O—C(=O)—CH=CH—;

each Z is one of H, alkyl, heteroalkyl, aryl, heteroaryl, alkoxy, nitro, cyano, halogen, or cycloalkyl; and each R is one of —O— or —NH—;

wherein the lignin derivative of formula I is hydrophobic and exposing the lignin derivative of formula I to an electromagnetic spectrum to isomerize the derivative to a cis configuration in order to impart hydrophilicity.

2. The coating composition of claim 1, wherein X is —N=N—; each Z is one of H, alkyl, heteroalkyl, aryl, heteroaryl, alkoxy, nitro, cyano, halogen, or cycloalkyl; and R is —NH—.

3. The coating composition of claim 1, wherein X is —CH=CH—C(=O)—O-(alkylene)-O—C(=O)—CH=CH—; each Z is, one of H, alkyl, heteroalkyl, aryl, heteroaryl, alkoxy, nitro, cyano, halogen, or cycloalkyl; and R is —O—.

4. The coating composition of claim 1, wherein the lignin derivative is present at about 0.5 weight percent to about 20 weight percent of the coating composition.

5. The coating composition of claim 1, further comprising a pigment comprising titanium dioxide, zinc oxide, tin oxide, tungsten oxide, or any combination thereof.

6. The coating composition of claim 1, wherein the coating is a decorative coating, an industrial coating, a protective coating, a self-cleaning coating, a biocidal coating, or any combination thereof.

7. The coating composition of claim 1, further comprising a solvent, a binder, a pigment, a rheology modifier, a plasticizer, or any combination thereof.

8. The coating composition of claim 1, wherein the coating is a latex emulsion, a non-aqueous dispersion, or a powder.

9. The coating composition of claim 1, wherein the electromagnetic spectrum has a wavelength of about 300 nanometers to about 1400 nanometers.

* * * * *

UNITED STATES PATENT AND TRADEMARK OFFICE
CERTIFICATE OF CORRECTION

PATENT NO. : 9,932,495 B2  
APPLICATION NO. : 14/694250  
DATED : April 3, 2018  
INVENTOR(S) : Raghu Page 1 of 1

It is certified that error appears in the above-identified patent and that said Letters Patent is hereby corrected as shown below:

In the Specification

In Column 5, delete " 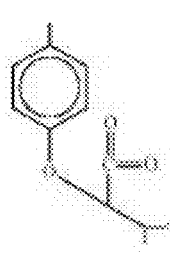 " and insert -- 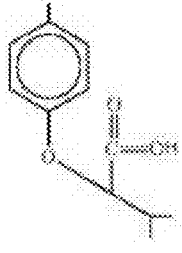 --, therefor.

Signed and Sealed this  
Twenty-ninth Day of May, 2018

Andrei Iancu  
*Director of the United States Patent and Trademark Office*